United States Patent Office
3,398,062
Patented Aug. 20, 1968

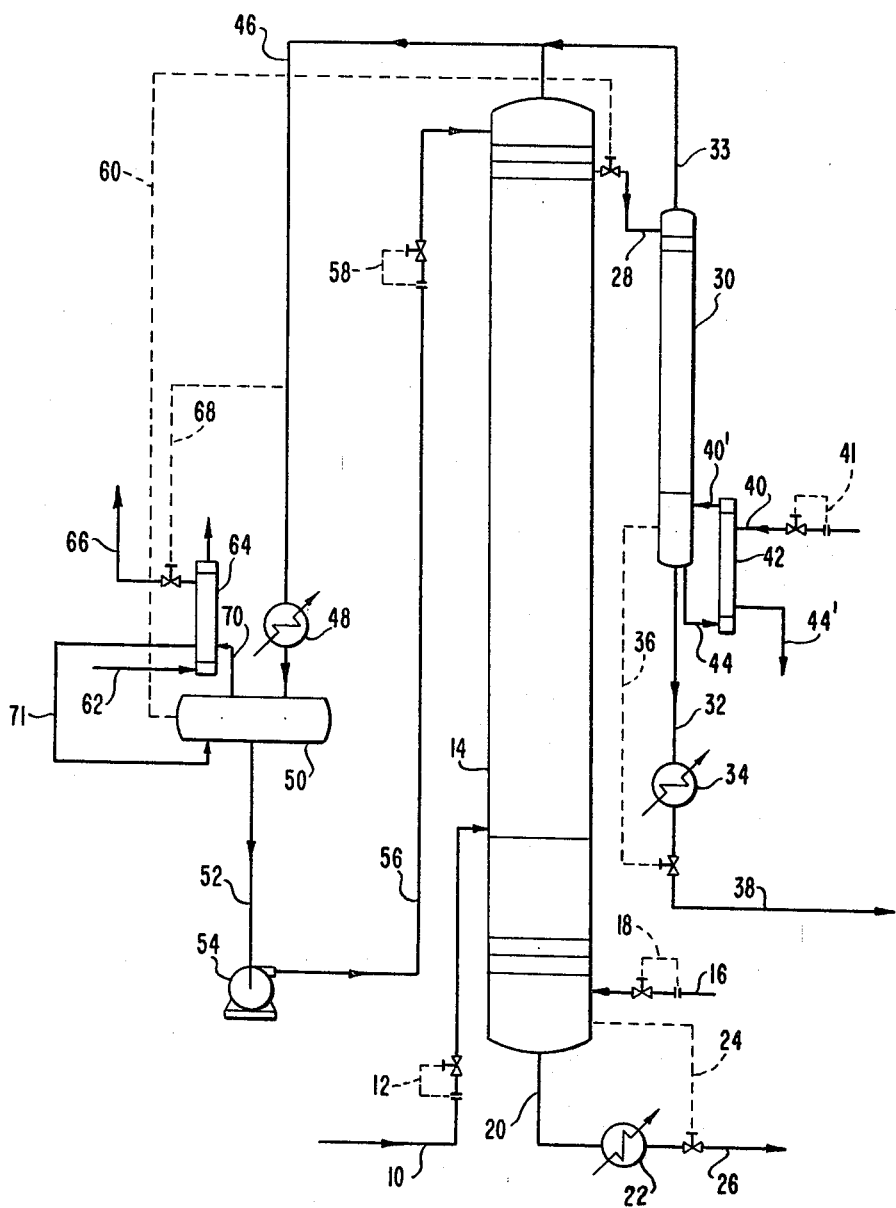

3,398,062
OLEFIN OXIDE PURIFICATION BY FRACTIONAL DISTILLATION FOLLOWED BY SIDE STREAM STRIPPING
Utah Tsao, Jersey City, N.J., assignor to The Lummus Company, New York, N.Y., a corporation of Delaware
Filed Feb. 10, 1965, Ser. No. 431,638
6 Claims. (Cl. 203—78)

ABSTRACT OF THE DISCLOSURE

A process for recovering an olefinic oxide, such as propylene oxide, from an impure solution thereof wherein the solution is first subjected to fractional distillation to separate the heavier components of the solution and recover the olefinic oxide and the lighter components. The lighter components are then stripped from the olefinic oxide and the olefinic oxide recovered as a substantially pure liquid.

---

This invention relates, in general, to a purification process and, more particularly, to the separation of impure gaseous streams. The invention is generally applicable to systems where the main product is unstable in the presence of other heavy components and the feed contains relatively small amounts of light components. An embodiment of the invention, described in detail hereinbelow, relates to an improved process for the production of purified propylene oxide from crude mixtures thereof containing propylene chloride, water dissolved gases, acetaldehyde and propionaldehyde as impurities therein.

The vapor phase, partial oxidation of aliphatic hydrocarbons such as propane, ethane, and the like, employing air or oxygen as the oxidizing agent, results in the production of a complex mixture of products, the recovery of which in pure form generally requires an intricate purification scheme. The early stages of such purification schemes result in the production of a number of fractions, each fraction containing compounds generally not amenable to simple separation techniques. One such accrued fraction contains propylene oxide as a major desired constituent, propylene chloride and water as major impurities, and a small amount of dissolved gases, acetaldehyde, and propionaldehyde. It is this fraction which the present invention succeeds in purifying in an improved manner.

Heretofore, the purification of olefinic oxide-containing gases has been accomplished by first passing the gas through an absorber and removing the olefinic oxide with the solvent as the bottoms product. Dissolved gases are also removed at this stage. The oxide-solvent stream is thereafter passed into a stripper for removal of substantially pure olefinic oxide. Alternatively, and perhaps even more commonly, the purification of olefinic oxides from impure streams is accomplished by first removing the light ends in a stripper, followed by fractionation to recover the pure oxide. Such a system has several inherent defects, that, for example, the stripper is ineffective in removing contained acetaldehyde, as the water in the overhead stream absorbs it as it is condensed. Also, the propylene oxide and water collecting in the bottom of the stripping column are generally subjected to a long residence time at high temperature, under which conditions the hydrolysis of the oxide to glycol occurs. Such hydrolysis, of course, reduces the yield of the purification process.

It is therefore a principal object of the present invention to provide an improved purification process for gaseous streams which overcomes the hereinabove described deficiencies.

A further object of the present invention is to provide a propylene oxide purification process wherein acetaldehyde is completely removed from the propylene oxide product.

Another object of the invention is to provide a propylene oxide purification process having both a higher efficiency in the stripping stage and more stability in the overall operation.

Yet another object of the invention is to provide a propylene oxide purification process wherein the hydrolysis of oxide to glycol is substantially eliminated.

Yet another object of the invention is to provide a propylene oxide purification process which produces a product of higher purity than processes heretofore in commercial usage, but in a manner which is no less economic than said commercial processes.

Other objects and advantages of the present invention will be made clear in the course of the following description of an embodiment thereof, and the novel features will be particularly pointed out in connection with the appended claims.

It has been discovered that all of the aforementioned objects may be attained with a relatively simple process wherein the procedures of the prior art are substantially reversed, i.e., the solution is first fractionated, followed by a stripping operation. In essence, the process of the invention comprises feeding the crude propylene oxide mixture, containing as impurities for example propylene chloride, water, small amounts of dissolved gases, acetaldehyde and propionaldehyde, into the lower part of a fractional distillation column, where the water is separated from the propylene oxide, and propionaldehyde and propylene dichloride are removed along with the water from the bottom of the column. Dissolved gases and acetaldehyde are removed as a overhead along with propylene oxide. To remove the dissolved gases and the acetaldehyde content of the propylene oxide product, the product stream from near the top of the fractionation column is passed through a stripper. It is to be noted that by operating in the foregoing fashion the acetaldehyde has no opportunity to recondense and dissolve in a water stream, and that the propylene oxide product is not subjected to being mixed with water in the stripper; hydrolysis to glycol is thus substantially eliminated. As an additional feature and further improvement of the present invention, light ends are withdrawn from the top of the fractionation column, condensed, and recycled as required, so that the amount of light ends in the stripper feed is minimized, which in turn minimizes temperature fluctuation in the product stream feeding into the stripper, improving thereby the efficiency of the stripping operation.

It is believed that a better understanding of the process of the invention will be gained by referring to the following detailed description thereof, taken in conjunction with the accompanying single drawing which is a flow sheet or flow diagram of a propylene oxide purification plant according to the invention.

In the drawing, process flow lines are indicated as solid lines and supervisory control functions are indicated as dotted lines.

With reference to the drawing, the crude propylene oxide feed, containing the above mentioned impurities, is fed in through line 10 which has thereon flow control circuit 12, and into the fractionator column 14 near the bottom. Fractionator column 14 is heated with steam from line 16 which is controlled by flow control circuit 18. Water, propionaldehyde and propylene dichloride are removed from fractionation column 14 as a bottom product through line 20, heat exchanger 22, and are disposed of as a waste product through line 26. The rate of bottoms withdrawal is controlled by level control circuit 24.

The product stream containing the propylene oxide, along with dissolved gases and acetaldehyde is withdrawn from fractionation column 14 through line 28 and is passed while hot into the stripper 30. Stripper 30 is provided with a steam circuit comprising inlet conduit 40 having flow control circuit 41, reboiler 42, inlet and exit conduits 40' and 44 respectively and conensate line 44' for use in cleaning the reboiler. The purified propylene oxide product is withdrawn from stripper 30 through line 32, heat exchanger 34 and line 38. Rate of withdrawal of the product in line 38 is controlled by a level controller circuit 36. A light ends fractions, including some heavier components, is also withdrawn from fractionation column 14, through line 46 at the top thereof, is passed to condenser 48, and finally into reflux drum 50. Condensates in reflux drum 50, including all heavier components, are withdrawn through line 52 to reflux pump 54 and recycled to fractionator 14 through line 56. Flow control circuit 58 provides one control on reflux, and level control circuit 60 provides a second control. Light ends in reflux drum 50 pass through line 70 to vent condenser 64 supplied with a refrigerant through line 62. Uncondensed light ends are vented through line 66; pressure control circuit 68 keeping the operation stable and balanced.

Operation of the process is described in the following specific example thereof, which is intended to be illustrative only and is not to be interpreted in a limiting sense.

EXAMPLE

The crude propylene oxide feed has the following analysis:

|  | Percent |
|---|---|
| Propylene oxide | 88 |
| Carbon dioxide | 0.0065 |
| Propylene | 0.0082 |
| Propylene dichloride & ether | 5.68 |
| Propylene aldehyde | 0.0025 |
| Water | 5.38 |

Crude propylene oxide is fed through line 10 into fractionator 14 at the rate of 12,199 pounds per hour (lb./hr.). The fractionator is maintained at 17 p.s.i.g. and 220° F., with steam entering through line 16. Refluxed material entering through line 58 amounts to 76,000 lb./hr., making a total input of 88,199 lb./hr. Bottoms are withdrawn through line 20 at the rate of 17,355 lb./hr., the bottoms being about 96% water and the remainder propylene dichloride. Temperature of the bottoms is reduced to 90° F., in heat exchanger 22 prior to discharge.

The product stream in line 28 amounts to 13,319 lb./hr., which is fed into stripper 30, operated at 11 p.s.i.g. and 120° F., with steam from reboiler 42. The bottoms from the stripper amount to 10,819 lb./hr., of pure propylene oxide. Overhead from stripper 30 in line 33, is mixed with the overhead from fractionator 14, both overheads amounting to 76,025 lb./hr., of 99+% propylene oxide. This stream is cooled to 112° F. in condenser 48, and uncondensed light ends at the rate of about 1000 lb./hr., are circulated to condenser 64 through lines 70, 71 25 lb./hr., being vented through line 66. The remaining material is recycled through reflux pump 54 as indicated hereinabove.

It will be understood that the embodiment of the invention as set forth hereinabove is illustrative only and that various changes in the steps, materials and arrangements of parts may be made by those skilled in the art within the scope of the invention as defined in the claims appended hereto. In particular, it will be clear to one skilled in the art that while the invention has been described with particular reference to the purification of propylene oxide, it is equally applicable, for example, to the purification of ethylene oxide, where the light-aldehyde will be formaldehyde.

What is claimed is:
1. In the recovery of an olefinic oxide from impure solutions thereof containing water and other impurities, including a light aldehyde, a process comprising:
   (a) introducing the impure solution into a fractional distillation zone;
   (b) withdrawing a bottoms containing water from the fractional distillation zone;
   (c) withdrawing an overhead, containing olefinic oxide and light aldehyde from the fractional distillation zone;
   (d) withdrawing a side stream, containing olefinic oxide and light aldehyde from an upper portion of said fractional distillation zone;
   (e) introducing the side stream into a stripping distillation zone; and
   (f) recovering a liquid stream of substantially pure olefinic oxide from the stripping distillation zone.

2. The process as claimed in claim 1 and further comprising withdrawing an overhead, containing olefinic oxide, and light aldehyde from said stripping distillation zone, combining the overhead from the stripping distillation zone with the overhead from the fractional distillation zone and condensing and recycling a portion of the combined overhead as reflux to the fractional distillation zone.

3. The process as claimed in claim 1, wherein said olefinic oxide is selected from the group consisting of propylene oxide and ethylene oxide.

4. In the recovery of propylene oxide from impure solutions thereof containing propylene chloride, water, dissolved gases, and acetaldehyde, a process comprising:
   (a) introducing the impure solution into a fractional distillation zone;
   (b) withdrawing a bottoms, containing water and propylene chloride from the fractional distillation zone;
   (c) withdrawing an overhead, containing propylene oxide, dissolved gases and acetaldehyde from said fractional distillation zone;
   (d) withdrawing a side stream, containing propylene oxide, dissolved gases, and acetaldehyde, from an upper portion of said fractional distillation zone;
   (e) introducing the side stream into a stripping distillation zone; and
   (f) recovering a liquid stream of substantially pure propylene oxide from the stripping distillation zone.

5. The process as claimed in claim 4 and further comprising withdrawing an overhead, containing propylene oxide, dissolved gases, and acetaldehyde, from said stripping distillation zone and combining the overhead from the stripping distillation zone with the overhead from the fractional distillation zone.

6. The process as claimed in claim 5 and further comprising, condensing and recycling a portion of the combined overhead as reflux to the fractional distillation zone.

References Cited

UNITED STATES PATENTS

| 2,612,467 | 9/1952 | Morrell et al. | 203—84 |
| 2,622,060 | 12/1952 | Robeson et al. | 203—83 |
| 2,672,434 | 3/1954 | MacFarlane | 202—154 |
| 2,672,435 | 3/1954 | Shoptaw | 202—154 |
| 2,672,436 | 3/1954 | Foxon | 203—84 |
| 2,944,627 | 7/1960 | Skarstrom | 55—62 |
| 3,073,753 | 7/1963 | Hadley et al. | 203—81 |
| 3,210,271 | 10/1965 | Byerly et al. | 203—84 |
| 3,282,966 | 11/1966 | Naugle et al. | 203—14 |

WILBUR L. BASCOMB, JR., *Primary Examiner.*